Dec. 7, 1971  R. J. LEVI  3,624,971

GRINDING CONTROL SYSTEM AND METHOD

Filed Aug. 30, 1968  3 Sheets-Sheet 1

INVENTOR.
RICHARD J. LEVI

BY
Lane, Aitken, Dunner & Ziems
ATTORNEY

INVENTOR.
RICHARD J. LEVI

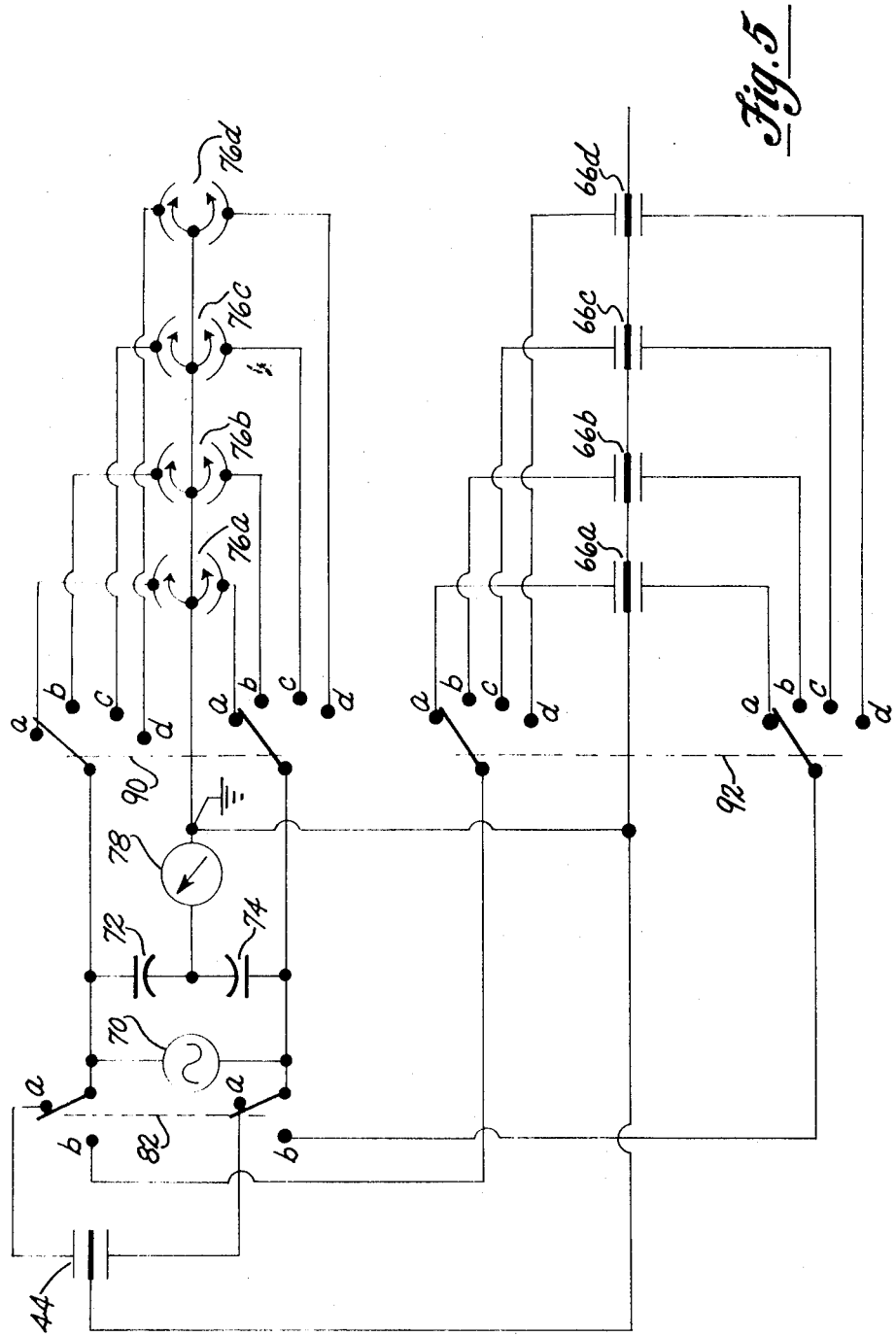

United States Patent Office 3,624,971
Patented Dec. 7, 1971

3,624,971
GRINDING CONTROL SYSTEM AND METHOD
Richard J. Levi, 256 Irving Ave., Closter, N.J. 07624
Filed Aug. 30, 1968, Ser. No. 766,358
Int. Cl. B24b 49/00
U.S. Cl. 51—165.74
16 Claims

ABSTRACT OF THE DISCLOSURE

A grinding control system for a valve assembly including means for determining the relative position between one member of the valve assembly and a reference standard similar to the other member of the assembly so that the assembly will provide a predetermined control of fluid flow, a transducer responsive to this relative position for generating an electric signal which is received by a storage means adapted to be connected to an additional transducer for controlling the grinding of the stem member. A method for controlling the grinding.

BACKGROUND OF THE INVENTION

This invention relates to a system and method for controlling the grinding of a valve assembly and, more particularly, to such a system and method for controlling the grinding of one member of a valve assembly so that it will effect a predetermined control of fluid flow when used in operation with a corresponding member of the assembly.

Valve assemblies utilizing a substantially cylindrical stem member having at least one flange or "land" portion formed thereon and adapted to move to and from a position in which it registers with a corresponding window formed in a cooperating sleeve member to control the flow of fluid, are generally known. In conditions requiring a precise metering of fluid through these valve assemblies, such as in connection with a fuel supply to a jet engine, or the like, the valve assemblies must be finished or "processed" with very high tolerances. The state of the art has progressed to a point where there are no longer any major problems involved in achieving these tolerances in processing the outside diameters of the stems including the land portions, and the inside diameters of the corresponding sleeves. However, since the registerability of each land portion of the stem with its corresponding window formed in the sleeve is very critical, it is also necessary to process the lands and/or the windows with the above same high tolerances. Difficulties arise in achiving these tolerances in the windows of the sleeve since the dimensions of the latter, after rough grinding, vary as much as 20 thousandths of an inch and the windows are very difficult to further gage and grind. It has been proposed to grind the land portions of the stem by mechanically measuring the sleeve to ascertain the grinding information for the stem. However, this information is insufficient to effect high precision grinding since the measurement is based on a single point-to-point dimension per land portion, and therefore does not take into consideration other parameters such as workpiece geometry, surface roughness in the final assembly, etc.

SUMMARY OF THE INVENTION

It is therefore an object of the present invention to provide a system and method for controlling the processing of a valve assembly having a sleeve member and a stem member so that said assembly will provide precise control of flow therethrough.

The present invention will be summarized with reference to the control system which, in general, comprises means for determining the relative position between one of said members and a reference standard similar to the other of said members in order to obtain the precise control of flow, a transducer responsive to said relative position for generating an electrical signal, information storage means adapted to be electrically connected to said transducer for receiving said electrical signal, and means adapted to be electrically connected to said storage means and responsive to said electrical signal for controlling the grinding of the other of said members.

BRIEF DESCRIPTION OF THE DRAWING

Reference is now made to the accompanying drawings for a better understanding of the nature and objects of the grinding control system and method of the present invention, which drawings illustrate the best mode presently contemplated for carrying out the objects of the invention and its principles, and are not to be construed as restrictions or limitations on its scope. In the drawings:

FIG. 5 is a circuit diagram of the system of the present invention.

DESCRIPTION OF THE PREFERRED EMBODIMENTS

Figure 1:
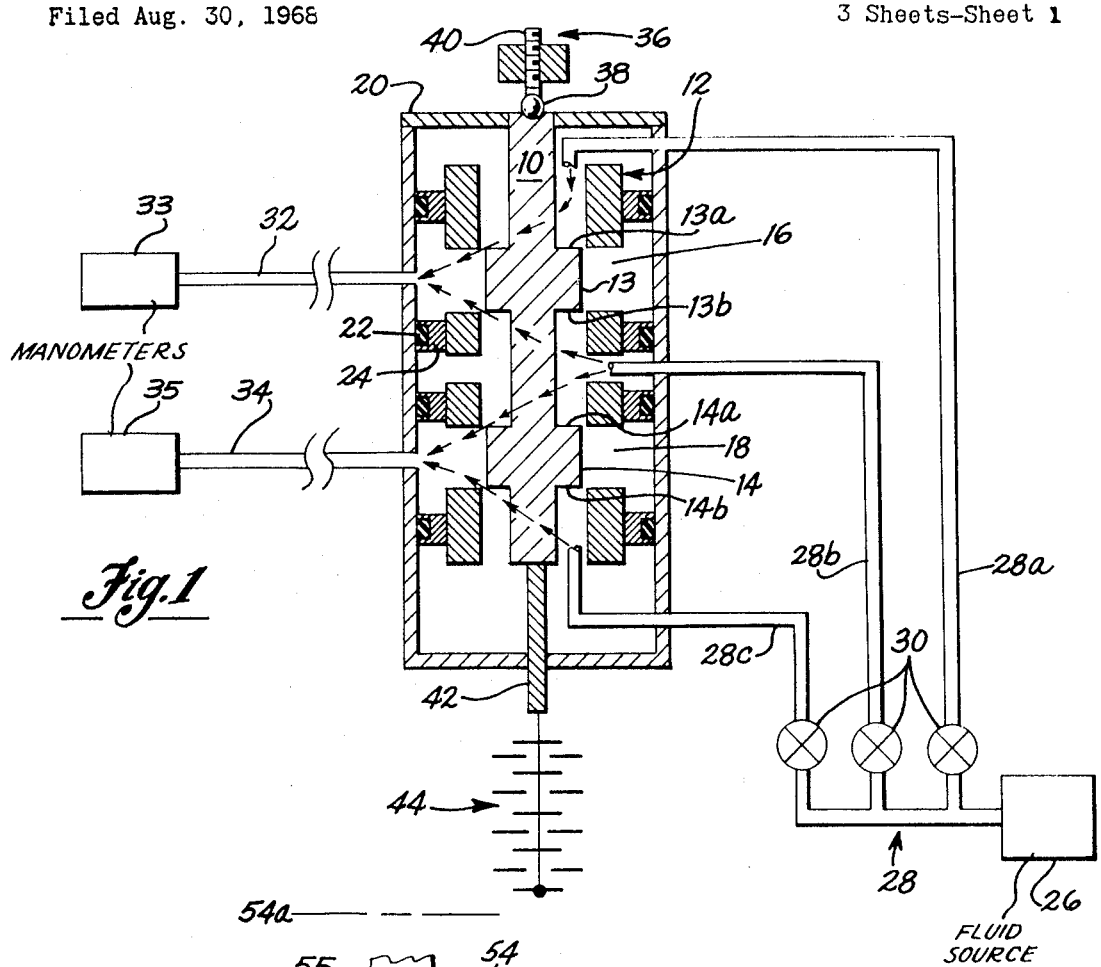
FIG. 1 is a cross-sectional view of the input gage assembly of the present invention.

Referring specifically to FIG. 1 of the drawings which depict a valve assembly after it has been inserted in the input gage assembly of the present invention, the reference numeral 10 refers to a valve stem member and the reference numeral 12 refers to a valve sleeve member. The stem member 10 is shown having two flanges or "land" portions 13 and 14, it being understood that any number other than two may be provided according to the particular requirements of the valve assembly. It is also understood that each valve stem and sleeve will have been previously "rough ground" to relatively low tolerances, and that the purpose of the present system and method is to control the final processing of the surfaces 13a and 13b of the land portion 13, and the surfaces 14a and 14b of the land portion 14, by grinding them in the axial direction of the valve stem 10, so that the land portions 13 and 14 will exactly mate with the windows 16 and 18, respectively, of the valve sleeve 12 in order to obtain a precise control of fluid flow through the assembly.

As shown in FIG. 1 the input gage assembly includes a housing 20, the inner wall of which is engaged by a plurality of sealing rings 22 which rest in flanges 24 formed on the outer surface of the sleeve assembly 12, thus dividing the housing 20 into a plurality of chambers. A source of pressurized fluid 26 is provided, along with a conduit system 28 which is adapted to selectively supply this fluid, by means of a plurality of solenoid operated valves 30, to the various chambers in the housing 20, and therefore through various portions of the valve assembly. Specifically, the conduit 28a supplies pressurized fluid to the upper chamber in housing 20 so that the fluid may pass through the opening provided between the surface 13a of the valve stem 10 and the corresponding surface of the window 16 of the sleeve 12, it being understood that the valve stem may be moved slightly from the position shown to provide a larger opening in accordance with the particular flow required. The fluid then passes out through a conduit 32 and to a manometer 33 for determining the pressure of the fluid and therefore its flow. In a similar manner, fluid passing through the conduit 28b into the central chamber of the housing 20 can take a path through the opening formed by the surface 13b and the corresponding surface of window 16, and through the conduit 32 and into manometer 33; or through the opening provided between the surface 14a and the corresponding surface of the window 18, and through a conduit 34 into a manometer 35, depending upon which of the manometers are opened. Also, pressurized fluid passing through the conduit 28c can pass through the opening formed between the surface 14b and the corresponding surface of the window 18, through the conduit 34 and into the manometer 35. It is thus seen that axial adjustment of the valve stem 10 with reference to the valve sleeve 12, and the proper selection of the conduits can provide simulated flow conditions and therefore determine the precise adjustment required to achieve a predetermined control of fluid flow through each individual opening provided by the valve assembly.

The upper portion of the valve stem 10 is engaged by a regulator assembly 36 which includes a ball 38 engaging an indented portion in the end of the stem 10, and a threaded screw portion 40, which, when rotated, will move the stem 10 axially with respect to the sleeve 12.

An anvil 42 is provided which engages the other end of the stem 10, extends through the housing 20, and is connected to a differential capacitance transducer 44. The latter may be of a generally known type, such as model AL147 described in Bulletin No. 0165 of the Electro-Autosizing Machine Corp., the assignee of the present application. In general the transducer 44 comprises a plurality of movable plates connected to the anvil 42 and movable between a plurality of fixed plates to vary the differential capacitance across the transducer.

It follows from the above that, in order to achieve a predetermined control of fluid flow through the opening formed between the surface 13b of the valve stem 10 and the corresponding surface of the window 16 of the valve sleeve 12, for example, the screw portion 40 is rotated to vary the axial position of the stem member 10 with respect to the valve sleeve 12 until the predetermined flow characteristics are achieved, which are indicated on the manometer 33. This axial movement of the valve stem 10 will change the differential capacitance across the transducer 44, thus providing an electrical signal directly proportional to the amount of adjustment necessary to achieve the predetermined flow. The application of this electrical signal will be described in detail later.

Figure 2:
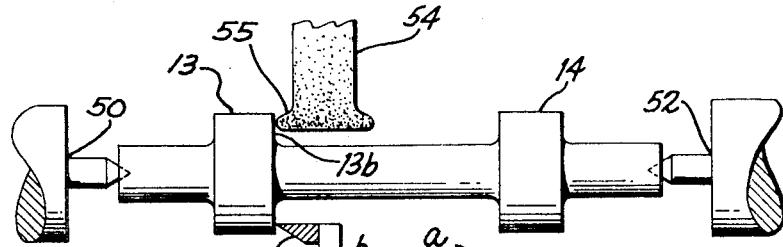
FIG. 2 is an elevational view of the grinding gage assembly of the present invention with the housing for the assembly being shown in cross-section.

A grinding gage head assembly, along with a grinding wheel, is shown in FIG. 2 of the drawings in position to gage and grind the surface of 13b of the land portion 13 of a valve stem 10. As shown, the valve stem 10 has a center cone formed in each end thereof, which cones are engaged by a head stock 50 and a tail stock 52 in a known manner, to rotatably support the stem. A grinding wheel 54 is provided, which is adapted to rotate about its axis 54a and which has a lip portion 55 in engagement with the surface 13b. A gage member 56 is in engagement with the surface 13b and is fixed to a transfer arm 58, a portion of which is enclosed in a housing 60. The arm 58 is mounted with respect to the housing 60 to pivot about point 62, and is engaged by one end of an anvil 64 which extends transversely to the arm 68, and is fixed at its other end to the movable plates of a differential capacitance transducer 66, similar in structure and operation to the transducer 44. It is understood that the stocks 50 and 52, and the housing 60 including the anvil 64, the transducer 66, and the pivot point for the transfer arm 58 are suitably mounted on a table which moves with respect to the wheel 54 during grinding, and that the housing 60 is resiliently mounted with respect to a surface common to the head stock 50, in order to compensate for any variations in the center cones of the stem 10.

It follows from the above arrangement that grinding of the surface 13b by the grinding wheel 54 and corresponding movement of the table in the direction indicated by the arrow a will cause a pivotal movement of the transfer arm 58 in the direction indicated by the arrow b, in proportion to the amount of grinding. The latter movement provides a change in the differential capacitance across the transducer 66 due to the connection of the movable plates of the latter with the transfer arm 58 via the anvil 64.

It is clear that, if a reference valve stem 10 having "perfect" or standard dimensions is placed in the housing 20 of the input gage assembly of FIG. 1, along with a valve sleeve 12 of an unknown tolerance; and the stem 10 is connected to the movable plates of the transducer 44 and is adjusted axially with respect to the sleeve to achieve a predetermined flow through one or more of the openings formed by the surfaces of land portions 13 and 14 and the corresponding surfaces of the windows 16 and 18, an electrical signal will be provided across the transducer 44 in response to the amount of adjustment required. Therefore, if a valve stem 10 of an unknown tolerance is placed in the grinding gage head assembly of FIG. 2 and is ground until the differential capacitance across the transducer 66 is equal to the above differential capacitance across the transducer 44, the ground valve stem 10 and valve sleeve 12 of unknown tolerance will together achieve the required predetermined flow characteristics.

Figure 3:
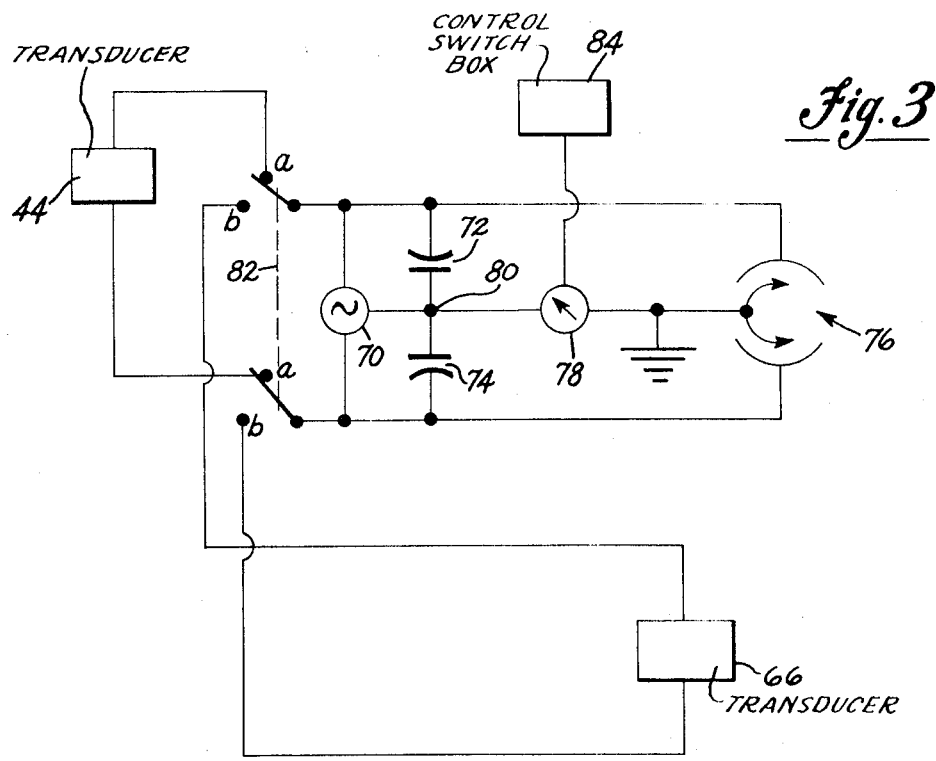
FIG. 3 is a diagrammatic view of the system of the present invention.

A system for effecting the above is shown diagrammatically with reference to FIG. 3. Specifically, a source of alternating current 70 is connected in parallel with a pair of stable capacitors 72 and 74, and with a compensating differential rotary capacitor 76, of a known type. A detector 78, which may include a meter, is connected between the rotary capacitor 76 and a junction 80 between the capacitors 72 and 74. A two-pole, two-position switch 82 is adapted to selectively connect the transducer 44 associated with the input gage assembly, or the transducer 66 associated with the grinding gage assembly, in parallel with the rotary capacitor 76, by moving to position a—a or to position b—b, respectively, so that the latter may vary the differential capacitance across the transducer 44 or the transducer 66. A control switching box 84 is electrically connected to the detector 78 and is responsive to predetermined electrical signals for controlling relays, switches and the like, which in turn, control the size, dwell, and speed change points of the grinding system in addition to the transverse feed, speed, and direction of the grinding wheel, as will be explained in detail later.

Figure 4:
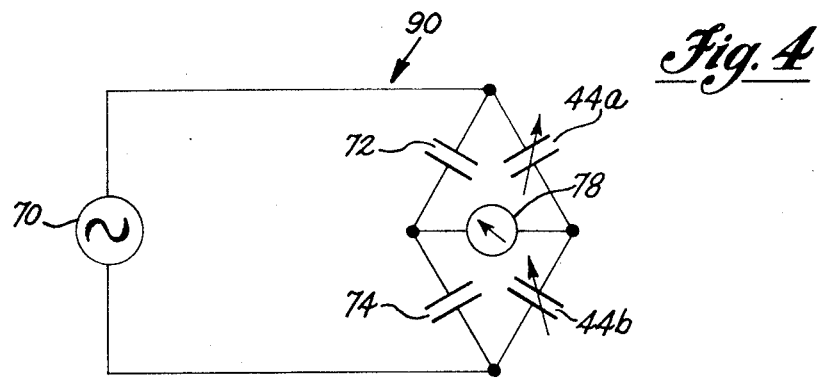
FIG. 4 is a bridge circuit utilized in the present invention.

Referring to FIG. 4, a bridge circuit 90 is shown which represents a circuit equivalent to the arrangement of FIG. 3, with the switch 82 in the position a—a. Specifically, the stable capacitors 72 and 74 each comprise a "leg" of the bridge and the two capacitances 44a and 44b, representing the effective differential capacitance across the transducer 44, before or after adjustment by the differential rotary capacitor 76, make up the other two legs. The detector 78 is connected to the junction between the capacitors 72 and 74, and to the junction between the capacitances 44a and 44b, so that when the bridge 90 is balanced, no current will flow through the detector.

It is understood that when the switch 82 is moved from position a—a to position b—b, the legs 44a and 44b are replaced by legs 66a and 66b which represent the effective differential capacitance across the transducer 66, before or after the adjustment by the differential rotary capacitor 76.

In operation, and assuming for example, that it is desired to grind the surface 13b of the valve stem in order to obtain a predetermined control of flow through the opening formed by it and the corresponding surface of the window 16 of the valve sleeve, the input gage assembly is initially "zeroed in" by inserting a reference standard valve stem and sleeve of known standard dimensions therein, moving the switch 82 to the position *a—a*, and connecting the stem to the anvil 42. Fluid is then passed from the source 26, through the conduit 28*b* and through the above opening in the valve assembly, and the valve stem is axially adjusted by rotating the threaded shaft 40 until a predetermined flow through this opening is indicated on the manometer 33. Then the normally fixed plates of the transducer 44 are adjusted with respect to the movable plates until a zero reading is obtained on the detector 78. The valve stem 10 is moved to the grinding gage assembly, the switch 82 is moved to the position *b—b*, and a similar operation is performed.

A sleeve of unknown tolerance is then substituted for the standard reference sleeve and it, along with the standard reference stem, is placed in the input gage assembly. The switch 82 is moved to the position *a—a*, and the standard reference stem 10 is adjusted with respect to the sleeve 12 of unknown tolerance until the same predetermined flow is achieved through the opening formed by the surface 13*b* and the corresponding surface of the window 16. It follows that, if the critical dimensions of the unknown sleeve differ from those of the standard sleeve, the reference stem will have to be moved axially to a new position different from the position attained during the zeroing operation to achieve the same predetermined flow, thus causing a differential capacitance to occur across the transducer 44. This differential capacitance will cause an unbalance of the bridge circuit 90, which unbalance will be in the form of an electrical voltage which will register on the detector 76. The compensating differential rotary capacitor 76 is then rotated until the bridge circuit is brought back into balance, by adjusting the capacitance across the transducer 44 until the detector again reads zero. Thus the capacitor 76, in its adjusted position, stores electrical information corresponding to the new axial position required of the reference stem with respect to the sleeve of unknown tolerance, in order to achieve the predetermined flow through the opening in question.

Then a stem of unknown tolerance which is to be used with the above sleeve of unknown tolerance is placed in the grinding gage head assembly of FIG. 2 and is connected, via the transfer arm 58 and the anvil 64, to the movable plates of the transducer 66. The switch 22 is moved to position *b—b* which results in an unbalanced condition occurring across the bridge circuit 90 due to the previous adjustment of the rotary capacitor 76. Grinding then commences on the surface 13*b* of the stem of unknown tolerance which causes corresponding pivotal movement of the transfer arm 58 in the direction *a* and resulting axial movement of the movable plates associated with the transducer 66. This latter movement continues until the plates reach a position in which the differential capacitance across the transducer 66 equals the differential capacitance stored by the rotary capacitor 76, which, of course, is equal to the original differential capacitance that occurred across the transducer 44, which balances the bridge 90. A circuit associated with the control switch box 84 (FIG. 3) is responsive to the balanced bridge in connection with the grinding gage assembly, and is adapted to stop the grinding operation. Thus the ground stem, when used with the above sleeve of unknown tolerance, will achieve the same predetermined flow characteristics as the reference assembly.

It is understood that a dwell step may be involved in the above operation in which case the grinding wheel 54 is stopped prior to finishing the grinding, in order to relieve pressure between the wheel and the workpiece to remove any deflection caused by the wheel pressure, and to obtain a fine finish. Of course, other movements of the grinding wheel may be controlled by the control switch box 84, such as transverse speed, feed, direction, etc.

It can be appreciated that, in the event there is more than one surface to be ground, such as when a valve stem similar to stem 10 of FIG. 1 is involved which has surfaces 13*a*, 13*b*, 14*a*, and 14*b*, it becomes highly desirable to pre-program the grinding operation for each of the surfaces in advance of any grinding. This is easily achieved in the present invention by providing a rotary capacitor similar to the capacitor 76, and a transducer similar to the transducer 66, for each surface involved, along with a switching system for switching these components in and out of the circuit according to the particular surface to be gaged and ground.

A circuit for achieving the above is shown with reference to FIG. 5 and is similar to the block diagram shown in FIG. 3, with the exception that a plurality of the rotary capacitors 76*a*–76*d* have been added, along with a plurality of transducers 66*a*–66*d* and a pair of four-pole four-position switches 90 and 92. Thus, in the initial setting up, each individual rotary capacitor 76 and transducer 66 is zeroed in, and the reference standard stem is placed, along with the sleeve of unknown tolerance, in the gage head assembly with the stem being attached to the single transducer 44. The correct relative position between each surface 13*a*, 13*b*, 14*a*, 14*b* and the corresponding surfaces of the windows 16 and 18 is then individually ascertained by means of the flow system shown in FIG. 1, and the rotary capacitors 76*a*–76*d* are individually adjusted in accordance with the axial position of the stem required for each opening, by moving the switch 90 to its position *a—a*, *b—b*, *c—c*, and *d—d*. Then, by moving the switch 82 to its position *b—b*, each transducer 66 can be connected to its corresponding rotary capacitor 76 by the switch 92, thus programing the grinding of the surfaces 13*a*, 13*b*, 14*a*, 14*b* in accordance with their particular requirements.

It is noted that the switches 90 and/or 92 can be manual or automatic and may be combined into a single switch. Further, once a pre-programed grinding operation is started on a particular valve stem, the operator can direct his attention to the adjustment of the rotary capacitors to store the grinding information for the next stem to be ground.

Of course, it is understood that only the essential electrical components have been shown and described in connection with the diagram and circuits of FIGS. 3–5, in the interest of brevity, and that various other components may be present in accordance with known engineering principles in order to produce the desired electrical signals.

It is thus seen that, by use of the system and method of the present invention, any number of surfaces of a member of a valve assembly can be gaged, the gaging information stored, and the other member ground in order to obtain an exact predetermined control of fluid flow through the assembly. In fact, it has been ascertained that tolerances of approximately plus or minus fifty millionths of an inch can be achieved according to the system and method of the present invention.

Several variations of the above may be effected without departing from the basic scope of the invention. For example, although the above description has been made with reference to grinding it is understood that any kind of processing such as cutting, sanding, etc., may be utilized. Furthermore, any type of transducer may be utilized as long as it produces varying detectable signals in proportion to the axial movement of the stems, and a resistive, inductive, fluidic, or any other type of bridge can be provided. Also, the valve sleeve can be ground rather than the valve stem in which case a reference standard sleeve would be used in connection with a stem of unknown tolerance in the input gage assembly. Further, a single manometer, or any type of flow measuring device or devices, can be utilized rather than the two manometers disclosed.

Also, it may be appreciated that the invention described above is not limited to the control of a grinding system, but rather the input gage assembly, including the flow system, may be used together with one of the differential capacitors and a meter, or the like, to simply provide a checking system for a valve assembly to ascertain, for example, how far from "perfect" a paritcular component is. Also, under certain circumstances it may not be necessary to store the grinding information by use of the rotary capacitor, in which case a direct connection may be made between the input gage assembly and the grinding gage assembly.

Of course, other variations of the specific construction and arrangements of the grinding valve system and method disclosed above can be made by those skilled in the art without departing from the invention as defined in the appended claims.

I claim:

1. A system for controlling the processing of a valve assembly having a sleeve member and a stem member so that said assembly will provide a predetermined control of fluid flow therethrough, said system comprising means for determining the relative position between one of said members and a reference standard similar to the other of said members in order to obtain said predetermined control, a transducer responsive to said relative position for generating a corresponding signal, said transducer being in the form of a differential capacitance transducer having at least one movable plate connected to said reference standard and at least one pair of fixed plates between which the movable plates moves to adjust the differential capacitance across said transducer in accordance with the position of said reference standard relative to said other member, information storage means adapted to be connected to said transducer for receiving and storing said signal, and means adapted to be connected to said storage means and responsive to said stored signal for controlling the processing of said other member.

2. The system of claim 1 wherein said storage means is in the form of a compensating differential rotary capacitor which is adjustable in accordance with said adjusted differential capacitance.

3. The system of claim 2 wherein the capacitance of said compensaitng differential rotary capacitor is adjustable to equal said adjusted differential capacitance.

4. The system of claim 3 wherein said means for controlling the processing of the other of said members comprises an additional differential capacitance transducer having at least one additional movable plate connected to said other member and at least one additional pair of fixed plates between which said additional plate moves to vary the differential capacitance across said additional differential capacitance transducer in accordance with the adjusted capacity of said compensating differential rotary capacitor.

5. The system of claim 4 wherein said means for controlling thep rocessing of said other member further comprises circuit means connected to said additional differential capacitive transducer and responsive to the differential capacitance of said additional differential capacitance transducer equalling the adjusted capacitance of said compensating differential rotary capacitor.

6. The device of claim 1 further comprising detector means for giving an visual indication of said signal.

7. A system for controlling the processing of a valve assembly having a sleeve member and a stem member so that said assembly will provide a predetermined control of fluid flow therethrough, said system comprising means for determining the relative position between one of said members and a reference standard similar to the other of said members in order to obtain said predetermined control, a transducer responsive to said relative position for generating a corresponding signal, information storage means adapted to be connected to said transducer for receiving and storing said signal, and a differential capacitance transducer adapted to be connected to said storage means and having at least one movable plate connected to said other member and at least one pair of fixed plates between which the movable plate moves to vary the differential capacitance across said differential capacitance transducer in accordance with said stored signal to control the processing of said other member.

8. A system for controlling the processing of a valve assembly having a sleeve member and a stem member so that said assembly will provide a predetermined control of fluid flow therethrough, said system comprising means to distribute pressurized fluid to one of said members and a reference standard similar to the other of said members so that they control the flow of said fluid, means for indicating said controlled flow of fluid and therefore the relative position between said one member and said reference standard, a transducer responsive to said relative position for generating a corresponding signal, information storage means adapted to be connected to said transducer for receiving and storing said signal, and means adapted to be connected to said storage means and responsive to said control signal for controlling the processing of said other member.

9. The system of claim 8 further comprising means to adjust one of said members relative to the other until said indicating means indicates said predetermined control of said fluid.

10. A system for controlling the processing of a valve assembly having two members which together define a fluid flow passage, said system comprising means for determining the relative position between one of said members and a reference standard similar to the other of said member in order to obtain a predetermined fluid flow through said passage, a transducer responsive to said relative position for generating a corresponding signal, and means adapted to be connected to said transducer and responsive to said signal for controlling the processing of said other member.

11. The system of claim 10 wherein said means for determining the relative position comprises means to introduce fluid to said passage and means for effecting relative movement between said members until said predetermined fluid flow is obtained.

12. The system of claim 11 wherein one of said members is moved relative to the other and wherein said transducer is operatively connected to the movable member and is responsive to said movement.

13. A method for controlling the processing of a valve assembly having two members which together define a fluid flow passage, said method comprising the steps of determining the relative position between one of said members and a reference standard similar to the other of said members in order to obtain a predetermined fluid flow through said passage, generating a signal in proportion to said relative position, and controlling the processing of said other member in accordance with said signal.

14. The method of claim 13 wherein said step of determining the relative position comprises the steps of introducing fluid to said passage and effecting relative movement between said members until said predetermined fluid flow is obtained.

15. The method of claim 14 wherein said signal is generated in proportion to the movement of one of said members.

16. The method of claim 13 further comprising the step of storing said signal after the step of generating said signal, said step of controlling being in accordance with said stored signal.

References Cited
UNITED STATES PATENTS

| | | | |
|---|---|---|---|
| 3,262,370 | 7/1966 | Magor | 90—13.5 |
| 3,264,788 | 8/1966 | Coes | 51—165 |
| 3,269,233 | 8/1966 | Lothmann | 235—151.11 |
| 3,292,495 | 12/1966 | Hill | 235—151.11 |

TERRELL W. FEARS, Primary Examiner

U.S. Cl. X.R.

90—11 C; 51—281 R, 2 AA

UNITED STATES PATENT OFFICE
CERTIFICATE OF CORRECTION

Patent No. 3,624,971      Dated December 7, 1971

Inventor(s) Richard J. Levi

It is certified that error appears in the above-identified patent and that said Letters Patent are hereby corrected as shown below:

Column 7, line 25, "plates" should read -- plate --.

Column 8, line 17, "control" should read -- stored --; line 28, "member" should read -- members --.

Signed and sealed this 11th day of July 1972.

(SEAL)
Attest:

EDWARD M. FLETCHER, JR.
Attesting Officer

ROBERT GOTTSCHALK
Commissioner of Patents